(12) United States Patent
Faulk, Jr.

(10) Patent No.: US 10,129,162 B1
(45) Date of Patent: Nov. 13, 2018

(54) SYSTEMS AND METHODS FOR DEFINING STORAGE

(71) Applicant: QLOGIC Corporation, Aliso Viejo, CA (US)

(72) Inventor: Robert Lee Faulk, Jr., Roseville, CA (US)

(73) Assignee: Cavium, LLC, Santa Clara, CA (US)

( * ) Notice: Subject to any disclaimer, the term of this patent is extended or adjusted under 35 U.S.C. 154(b) by 316 days.

(21) Appl. No.: 14/716,689

(22) Filed: May 19, 2015

Related U.S. Application Data (60) Provisional application No. 62/061,847, filed on Oct. 9, 2014.

(51) Int. Cl.
*H04L 12/801* (2013.01)
*H04L 12/813* (2013.01)

(52) U.S. Cl.
CPC ............. *H04L 47/33* (2013.01); *H04L 47/20* (2013.01)

(58) Field of Classification Search
CPC .............................. H04L 47/33; H04L 47/20
See application file for complete search history.

(56) References Cited

U.S. PATENT DOCUMENTS

| | | | | |
|---|---|---|---|---|
| 7,382,637 | B1 * | 6/2008 | Rathnavelu | G11C 15/00 365/189.05 |
| 2002/0071389 | A1 * | 6/2002 | Seo | H04L 45/00 370/232 |
| 2005/0198224 | A1 * | 9/2005 | Kobayashi | H04L 67/322 709/220 |
| 2006/0143432 | A1 * | 6/2006 | Rothman | H04L 67/34 713/2 |
| 2006/0160533 | A1 * | 7/2006 | Chou | H04L 41/0803 455/422.1 |
| 2014/0101279 | A1 * | 4/2014 | Nagami | H04L 67/1097 709/213 |
| 2014/0286342 | A1 * | 9/2014 | Xia | H04L 45/38 370/392 |
| 2015/0341267 | A1 * | 11/2015 | Chiba | H04L 47/10 370/392 |
| 2015/0365537 | A1 * | 12/2015 | Kahn | H04M 15/58 455/408 |
| 2016/0373301 | A1 * | 12/2016 | Sakata | H04L 67/30 |

OTHER PUBLICATIONS

Nygren, Anders et al., "OpenFlow Switch Specification", Open Networking Foundation,(Oct. 14, 2013),Version 1.4.0 (wire Protocol Ox05).

* cited by examiner

*Primary Examiner* — Chirag G Shah
*Assistant Examiner* — Joshua Smith
(74) *Attorney, Agent, or Firm* — Klein, O'Neill & Singh, LLP (57) ABSTRACT

System and methods are provided for providing modular control of network data packet handling and configurations. In one aspect, a storage-to-network mapping data structure is provided that can translate network connection parameters into high level, searchable concepts. In turn, these searchable concepts can be used by one or more modular software-defined storage applications to provide rules for network traffic handling that can then be merged into a dataplane forwarding data structure for implementation by a dataplane forwarder.

21 Claims, 6 Drawing Sheets

SYSTEMS AND METHODS FOR DEFINING STORAGE

CROSS-REFERENCE TO RELATED APPLICATION

This patent application claims priority under 35 USC 119(e) to U.S. Provisional Patent Application, Ser. No. 62/061,847, entitled "Systems and Methods for Defining Storage", filed on Oct. 9, 2014, the disclosure of which is incorporated herein by reference in its entirety.

TECHNICAL FIELD

The present aspects relate to defining storage in network systems.

BACKGROUND

A computer network, often simply referred to as a network, is a group of interconnected computers and devices that facilitates communication among users and allows users to share resources. Adapters, switches, and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data. For example, options include direct-attached storage (DAS), network-attached storage (NAS), and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System), and others for storing and managing data at storage devices.

A SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (Internet Small Computer System Interface, i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing and accessing data at storage devices.

Cloud-based storage may operate over a converged network that combines one or more storage area networks with one or more general-purpose computer networks.

Current interfaces for storage systems, such as iSCSI, Fibre Channel, or iSER (iSCSI Extensions for RDMA (Remote Direct Memory Access)) typically specify parameters for each connection as it is established. These interfaces support operations such as connect, login, write, read, set QoS (Quality of Service), or create storage volumes. These interfaces are typically implemented as APIs (Application Programming Interfaces) or PCI (Peripheral Component Interconnect) mailbox registers, in drivers or firmware that in turn configure lower level drivers or ASICs (Application Specific Integrated Circuits) to send and receive network packets and perform a given operation.

Traditional storage interfaces operate on a connection-by-connection basis and have limited ability to affect the operation of the network as a whole. When a new feature is needed such as network security, application software is modified and re-tested which generally requires reestablishing all connections with modified settings. This is undesirable, especially in a cloud based environment, where multiple tenants/clients access storage via networks. In the cloud environment, a cloud controller needs to have an efficient mechanism for managing varying bandwidth/QOS for different tenants and tenant types. Traditional storage/network architecture does not provide this efficient mechanism. Continuous efforts are being made to improve networking systems to provide greater control and flexibility.

SUMMARY

The present aspects have several features, no single one of which is solely responsible for their desirable attributes. Without limiting the scope of the present aspects as expressed by the claims that follow, their more prominent features now will be discussed briefly. After considering this discussion, and particularly after reading the section entitled "Detailed Description," one will understand how the features of the present aspects provide the advantages described herein.

This disclosure describes a storage system with a new style of interface. It can be used in targets or initiators with iSCSI or iSER; it can also be used by Fibre Channel and other protocols.

In an aspect, the disclosure provides a machine-implemented method for configuring network connections in a network, the method including: generating a storage-to-network mapping data structure, whereby one or more network connection parameters are translated to storage specific parameters; receiving a flow data structure comprising a set of network connection processing rules described in relation to storage specific parameters; combining a network connection data structure, the storage-to-network mapping data structure, and the flow data structure to generate a dataplane forwarding data structure, wherein the dataplane forwarding data structure provides a set of network packet processing rules that are used by a dataplane forwarder module for processing a network packet; and processing the network packet according to the rules of the dataplane forwarding data structure.

In another aspect, the disclosure provides a network device for configuring network connections, the device including: a network port; a processor; and memory for storing machine executable instructions, that, when executed by the processor, cause the device to: generate a storage-to-network mapping data structure, whereby one or more network connection parameters are translated to storage specific parameters; receive a flow data structure comprising a set of network connection processing rules described in relation to storage specific parameters; combine a network connection data structure, the storage-to-network mapping data structure, and the flow data structure to generate a dataplane forwarding data structure, wherein the dataplane forwarding data structure provides a set of network packet processing rules that are used by a dataplane forwarder module for processing a network packet; and process the network packet according to the rules of the dataplane forwarding data structure.

In another aspect, the disclosure provides a machine-readable medium comprising processor executable instructions for configuring network connections, the instructions including: generating a storage-to-network mapping data structure, whereby one or more network connection parameters are translated to storage specific parameters; receiving a flow data structure comprising a set of network connection processing rules described in relation to storage specific parameters; combining a network connection data structure, the storage-to-network mapping data structure, and the flow data structure to generate a dataplane forwarding data structure, wherein the dataplane forwarding data structure provides a set of network packet processing rules that are used by a dataplane forwarder module for processing a network packet; and processing the network packet through the network port according to the rules of the dataplane forwarding data structure.

BRIEF DESCRIPTION OF THE DRAWINGS

The various present aspects will be discussed in detail with an emphasis on highlighting the advantageous features. These aspects depict the novel and non-obvious systems and methods for quality of service in networks shown in the accompanying drawings, which are for illustrative purposes only. These drawings include the following figures, in which like numerals indicate like parts.

DETAILED DESCRIPTION

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs—Central Processing Unit(s)). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single or multiple software program(s), firmware program(s), and/or hardware unit(s). The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The various aspects disclosed herein, may be implemented as a computer process (method), a computing system, or as an article of manufacture, such as a computer program product or a non-transitory computer-readable media. The computer program product may be non-transitory computer storage media, readable by a computer device, and encoding a computer program of instructions for executing a computer process.

Various network standards and protocols may be used to enable network communications to access storage devices/storage space, including Fibre Channel (FC), Fibre Channel over Ethernet (FCoE), iSCSI, Internet Protocol (IP), Ethernet, and others. Below is a brief introduction to some of these standards. The present aspects are described herein with reference to the iSCSI, IP, and Ethernet Protocols. However, these protocols are used merely for ease of reference and to provide examples. The present aspects are not limited to IP, iSCSI, and Ethernet.

Fibre Channel (FC) technology is based on a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

iSCSI is an Internet Protocol (IP)-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients (called initiators) to send SCSI commands (also known as Command Descriptor Blocks or CDBs) to SCSI storage devices (called targets) on remote servers. It is a SAN protocol, allowing organizations to consolidate storage into data center storage arrays while providing host applications with the illusion of locally attached disks. Unlike traditional Fibre Channel, which requires special-purpose cabling, iSCSI can be run over long distances using existing network infrastructure.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

FCoE is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet (or any other network) and cloud computing allows shared resources, for example, software and information, to be available, on-demand, like a public utility.

Typical cloud computing controllers (managed by cloud providers and may be referred to interchangeably) deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

A flow based, modular approach to configuring networked storage systems is described herein. In one aspect, a storage-to-network mapping data structure (for example, a table) is provided to translate a network connection data structure into high level storage concepts. Additionally, one or more software defined storage (SDS) applications configure SDS flow data structures (which may be referred to as tables herein, although other data structures may be used in various aspects) for networking rules in terms of high level storage concepts. The SDS flow data structures can then be combined with the high level storage concept network connection information to create a dataplane forwarding data structure with rules that are understandable to conventional networking hardware for handling incoming and outgoing data packets, in a router, networking adapter, switch or the like. In one aspect, SDS applications can be configured independently of conventional networking configurations to provide a modular, plug-and-play type networking configuration capability.

Figure 1A:
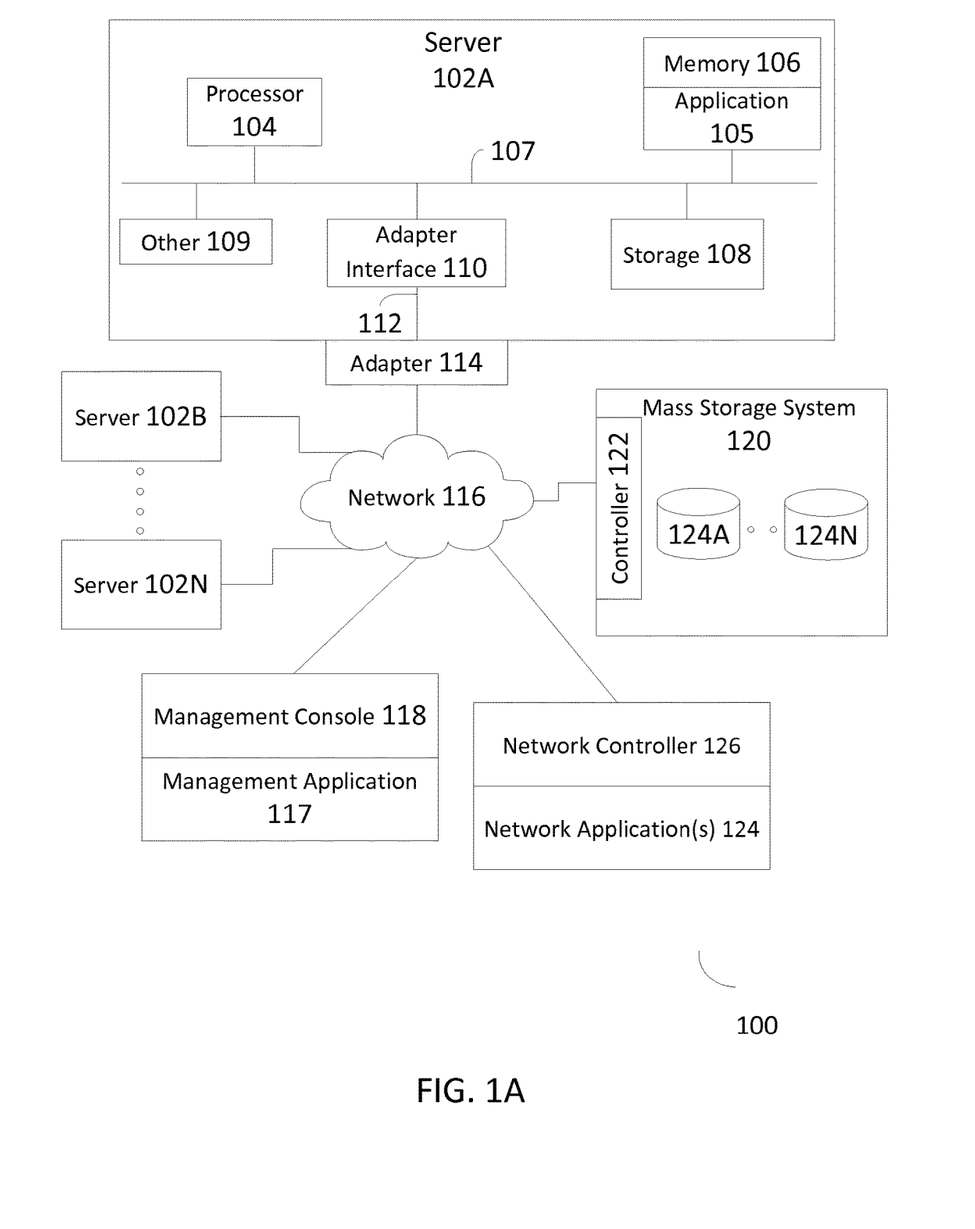
FIG. 1A is a block diagram of a storage system that may utilize the teachings of the disclosures herein.

System 100: FIG. 1A is a block diagram of a system 100 configured for use with the various aspects of the present disclosure. System 100 may include a plurality of computing systems 102A-102N (which may also be referred to generally as server(s) 102 or host system(s) 102), each coupled to an adapter 114 that interfaces with other devices, as described below in more detail.

The computing system 102 may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

The host system 102 may further include a storage device 108, which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers) and/or application program files, for example, email applications, database applications, management applications, and other application files. Some of these files are stored on storage 108 using an installation program. For example, the processor 104 may execute computer-executable process steps of an installation program so that the processor 104 can properly execute the application program.

Memory 106 also interfaces with the computer bus 107 to provide the processor 104 with access to memory 106. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one aspect, processor 104 may execute an application 105 for performing certain functions. For example, application 105 may be a database application, a virtual machine executed in a virtual environment (provided by VMware Corporation, Microsoft Corporation or any other entity), an electronic email application (for example, Microsoft Exchange), or any other application type. Application 105 may issue read and write requests that are processed by adapter 114, as described below in more detail. Application 105 may also be referred to as a "client."

The host system 102 also includes other devices and interfaces 109, which may include a display device interface, a keyboard interface, a pointing device interface and others. The details of these components are not germane to the inventive aspects.

Adapter 114 may be configured to handle both network and storage traffic while interfacing with other elements. In one aspect, as described below in detail, adapter 114 may be configured to provide the functionality of a host bus adapter (HBA) by providing connectivity to SAN-(storage area network-) based storage arrays as well as, in one aspect, present logical storage from a local storage device connected to the adapter. Adapter 114 may comprise a HBA, a network interface card (NIC) or any other device for facilitating communication over the network 116. The adapter 114 may include a converged network adapter for processing information complying with storage and network protocols, for example, Fibre Channel and Ethernet. As an example, the adapter 114 may be an FCoE adapter.

The computing system 102 uses an adapter interface 110 to communicate with adapter 114 via a link 112. In one aspect, link 112 may be a PCI-Express link or any other interconnect type. The adaptive aspects disclosed herein are not limited to any particular link type.

Adapter 114 may communicate and interface with a mass storage system 120 via a network 116 that may include one or more switch(es) (may be referred to as fabric switch) and/or routers. Network 116 may include a storage attached network (SAN), a local area network (LAN), a wide area network (WAN), and/or a converged network. The mass storage system 120 may include a plurality of storage devices 124A-124N. Storage space at storage devices 124A-124N may be presented as SAN LUNs to application 105 via network 116. Controller 122 of mass storage system 120 may be used to manage storage devices 124A-124N. In one aspect, controller 122 may include a processor, an adapter 114 and other similar components.

System 100 may also include a management console 118, used according to one aspect. Management console 118 may be a computer system similar to computing system 102 described above in detail. Management console 118 executes a management application 117 that may be used to configure storage space as logical structures (for example, as logical entities referred to as logical unit numbers (LUNs)) that are presented to computing systems 102-102N for storing information. Permissions associated with a LUN may also be configured using management application 117. The permissions indicate which entities may be allowed to access a LUN to read and/or write information.

System 100 may also include a network controller 126, used according to one aspect. Network controller 126 also may comprise a computer system similar to computing system 102 described above in detail or may be a simplified network-connected device. In general, network controller 126 is a central controller that executes one or more network applications 124 that, in turn, program various other devices on the network 116 as described in more detail herein.

It is noteworthy that a server 102, as referred to herein, may include a computer, server or other similar devices, which may be coupled to storage systems. In general, an adapter 114 may be connected to, or be included as part of, a server (102), a router, a switch, a computer, or other network component.

Figure 1B:
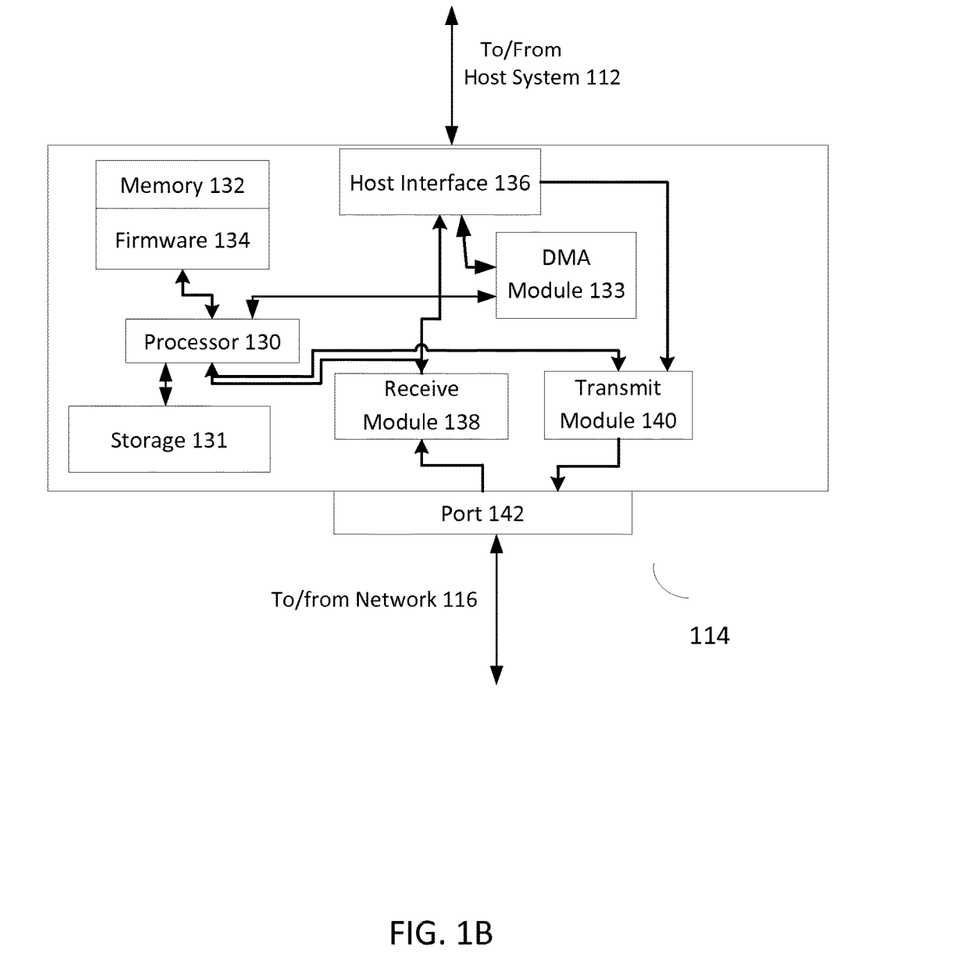
FIG. 1B is a block diagram of an adapter, according to one aspect of the present disclosure.

FIG. 1B illustrates an example adapter 114 according to one aspect. In general, an adapter comprises a processor 130 and memory 132 which stores firmware 134 for operating various aspects of the adapter 114. Memory 132 may also be used to store various data structures used by the various aspects of the present disclosure, as described below in detail. Adapter 114 also includes a local storage device 131, for example, non-volatile flash memory for storing adapter parameters, configuration information and other information.

The adapter 114 further includes a host interface 136 for communicating with, for example, server 102 through its adapter interface 110 and link 112. In one aspect, the adapter also comprises a receive module 138 and a transmit module 140 that interact with host interface 136 and a port 142. The receive module 138 handles incoming communications from the network 116 and may process them with processor 130 and/or forward the communications to the host interface 136. Similarly, the host interface 136 accepts communications from the server 102 and sends them to transmit module 140 for processing to forward through port 142 out to the network 116. Port 142 includes logic and circuitry to receive and send information via network 116.

Adapter 114 also includes a direct memory access (DMA) module 133 that manages access to link 112 for sending and receiving information. In one aspect, DMA transfers are made for moving data and status between storage locations at adapter 132 (for example, at the receive and/or transmit modules 138 and 140 as well as memory 132) and host memory 106.

Figure 1C:
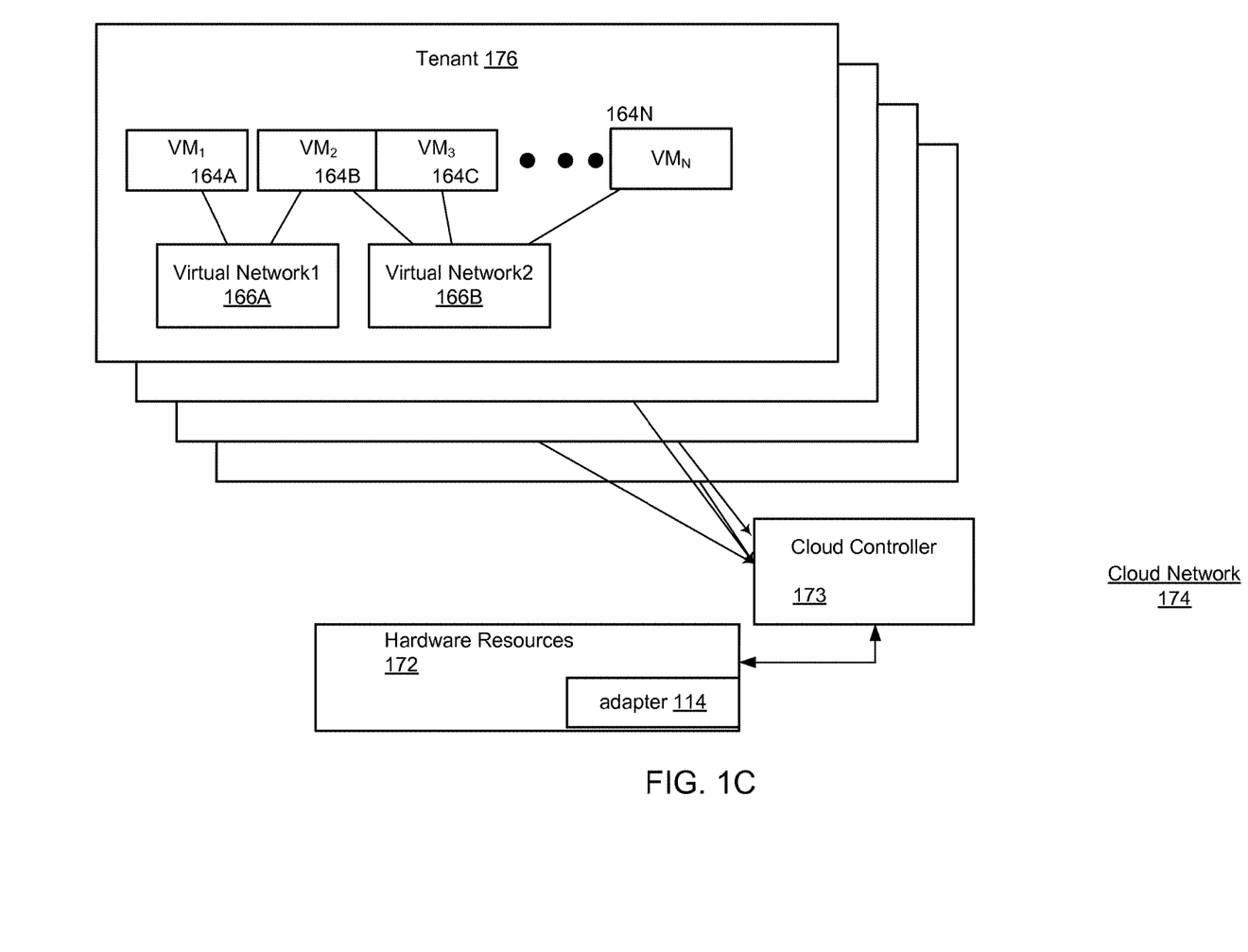
FIG. 1C is a block diagram of a virtualized cloud computing system used according to one aspect of the disclosure.

In some aspects, such as with respect to cloud-based computing, hardware resources are shared and presented in a virtual machine environment to various users or tenants. FIG. 1C illustrates a block diagram of a cloud network 174 operating according to a virtualized environment. In general the cloud network 174 includes hardware resources 172, including, for example, one or more adapters 114. Other hardware resources may include, network routers and switches, servers, storage, and the like. Hardware resources 172 may be consolidated in a single machine or extend among a network of machines. These hardware resources 172 are shared by a number of tenants 176. Tenants may represent a virtual space for a particular individual, company, or the like who may have leased or purchased access to the hardware resources 172. In one aspect, a tenant 176 may include one or more independently operating processor executable virtual machines ($VM_1$ . . . $VM_N$), shown as 164A-164N. Additionally, tenants 176 may have virtualized network connections 166A, 166B between various resources to allow communication between its different VMs, for example. As illustrated, $VM_1$ and $VM_2$ may communicate through virtual network 1 166A; while $VM_2$, $VM_3$, and $VM_N$ may communicate through virtual network 2 166B.

In one aspect, cloud network 174 may also include a cloud controller (may also be referred to as a cloud provider) 173 that controls access to cloud based resources, for example, hardware resources 172. The cloud controller 173 may be a computing device between tenants and hardware resources. In one aspect, cloud controller 173 may be responsible to provide certain bandwidth to each tenant based on a service level agreement. The bandwidth parameters may be managed by the various aspects of the present disclosure as described below in detail.

Software Defined Storage (SDS): The present disclosure provides flow-based configuration of storage systems. In one aspect, a network controller 126 running network applications 124 configures an adapter 114 to follow SDS rules by operating according to match/action flow rules that are generated and operate in parallel with typical host bus adapter (HBA) operations. This general configuration enables separate applications to control certain aspects of the adapter. In one aspect, network flow rules are ordered to provide a priority ranking so that only the highest priority matching rule is carried out and maintained in a mapping data structure. When processing packets and establishing new connections, adapter 114 scans the rules in priority order and a "hit" occurs for a first matching flow rule. In one aspect, actions for that rule are executed even if subsequent rules in the table are also a match. A few examples of such a rule-based system are set forth below.

Example 1. The rules mentioned in this example prevent a storage volume identified as "61" from being connected to disallowed networks:

Rule 1: volume=61; VM_IP==10.*.*.*; VNET_ID=101; Action=Allow

Rule 2: volume=61; Action=Deny

If an application, using the rules above, attempts to access volume 61, unless its VNET_ID (Tenant Virtual Network Identifier) matches 101 and it's VM_IP (virtual machine IP address) equals 10.*.*.* (where the asterisks indicate any value is acceptable), the access attempt will be denied. An application that has a VNET_ID of 101 will match Rule 1 first and is allowed access. In one aspect, packets that are denied may be dropped. Since the "deny" rule is Rule 2, volume 61 traffic that does not match the Rule 1 is denied.

Example 2. The rules in this example allow different service levels for cloud tenant storage volumes:

Rule 1: volume=61; tenant=1; action=rateLimit10 MBps
Rule 2: volume=62; tenant=2; action=rateLimit200 MBps Here, tenant 1 can access volume 61 but is limited to 10 MBps data transfer limit while tenant 2 is allowed to access volume 62 using a maximum rate of 200 MBps.

Example 3. With a multi-port HBA, a bandwidth controller may be used to optimize a fabric switch by load balancing connections based on a bandwidth limit established for each tenant. In this example, traffic for two premium high bandwidth tenants is transmitted via port 0 of the HBA, and all other tenants use port 1:

Rule1: tenant=23; action=send out port 0; rateLimit200 MBps
Rule2: tenant=132; action=send out port 0; rateLimit200 MBps
Rule3: tenant=*; action=send out port 1; rateLimit10 MBps SDS and Multi-Tenant Cloud Networks: With Multi-Tenant cloud networks, tenants' media access control addresses ("MAC addresses"—identifiers assigned to network interfaces for network communications) and IP addresses are not always unique. In such a network, each tenant frame is encapsulated with an outer header containing a Tenant Virtual Network Identifier (VNET ID) and an IP source and destination address of a cloud provider (that manages cloud controller 173) hosts that are hosting the tenant machines. Tenants choose their own addresses, and cloud control software configures mapping tables of the provider edge systems to perform packet encapsulation. These tables map {tenant destination mac address+tenant VNET ID} to {cloud provider destination IP address and cloud provider network}. As tenant systems are migrated to other hosts in the cloud provider network, the provider's cloud control software reprograms the mapping table entries so the traffic is sent to the proper system. Rather than complicating traditional storage software with this mapping, SDS can enable separate cloud control software to control this mapping using the SDS flow interface described herein.

In one aspect of this disclosure, software and firmware translate the above SDS flow-based storage policies into forwarding data structures (for example, tables) used by a dataplane. SDS may be implemented in firmware and hardware on an HBA, or it can be implemented by programmable instructions executed by host system 102.

Figure 2:
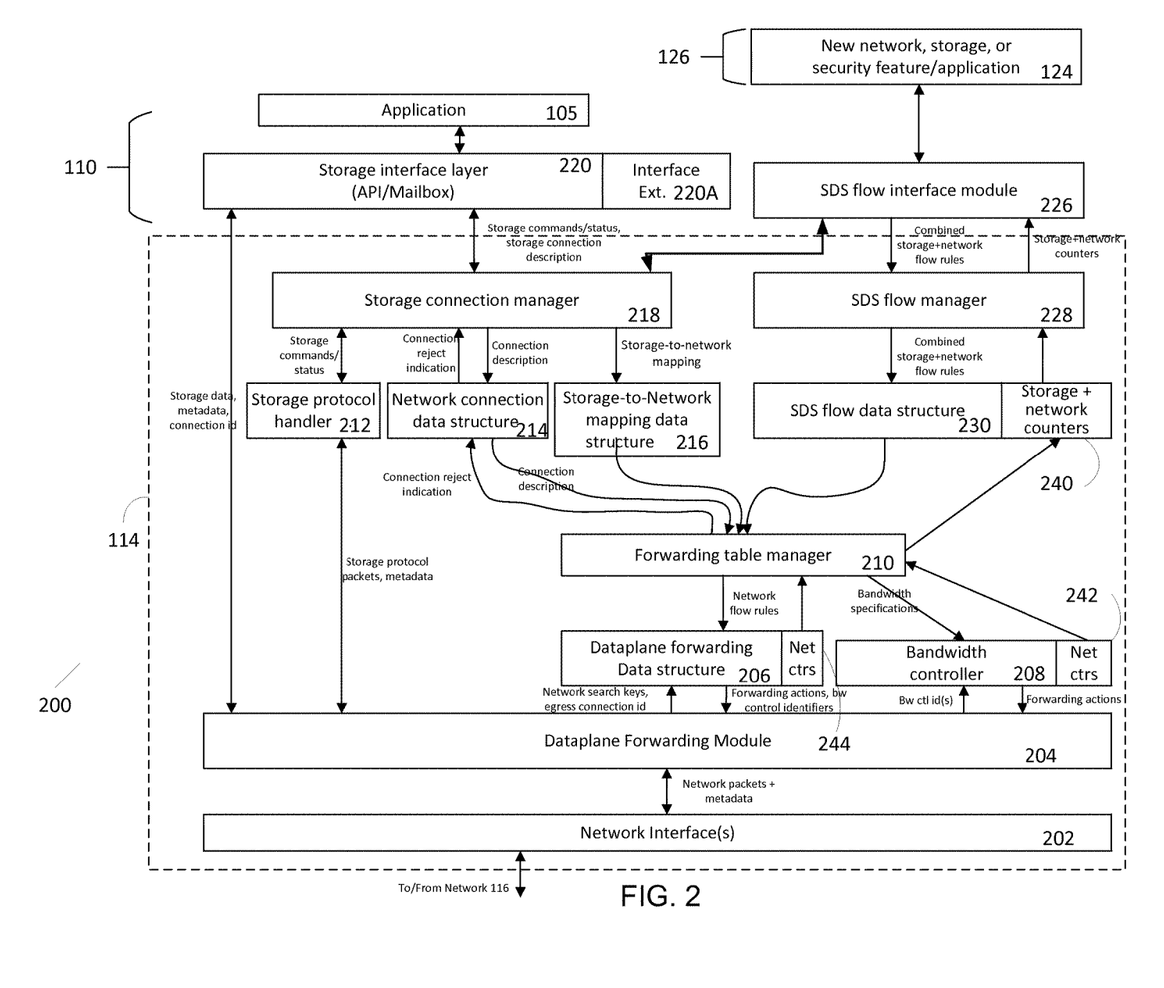
FIG. 2 is a block diagram of an architecture, according to one aspect of the present disclosure.

Architecture 200: FIG. 2 illustrates architecture 200, according to various aspects of the present disclosure to implement flow control ideas, such as those generally described in the examples above. The various modules of architecture 200 may be distributed between host 102 (such as adapter interface 110), adapter 114, and network controller 126. In different aspects, the modules described in FIG. 2 may be split among the adapter 114, host system 102, and network controllers differently than illustrated in FIG. 2.

As illustrated, adapter 114 includes one or more network interfaces (or ports 142, FIG. 1B) 202 for sending and receiving data across a network. The network interface(s) 202 is/are connected to a dataplane forwarder module (may also be referred to as dataplane forwarder) 204 which controls routing of inbound and outbound network traffic through network interface 202. In one aspect, the dataplane forwarder 204 is controlled by rules generated from a dataplane forwarding data structure (may also be referred to as dataplane forwarding table or tables) 206, which will be described in more detail herein.

In one aspect, application 105 interacts with a traditional storage interface layer (shown as storage interface) 220 to send data through a network, manage network connections, and the like. The storage interface layer 220 provides a mailbox and/or application programming interface (API) layer to communicate with application 105. The communication includes read and write commands (may be referred to as input/output (I/O) requests), status information regarding I/O requests, storage connection information and other information. The storage interface layer 220 receives commands from the application 105 and provides data and/or status for the requests.

In one aspect, the storage interface layer 220 also communicates with a storage connection manager 218 (for storage command and status, for example) and may also communicate directly with the dataplane forwarder 204 (for sending storage data and the like through the network, for example). Storage connection manager 218 in turn communicates with a storage protocol handler 212 and helps to create and update a network connection data structure (e.g., a table) 214 and a storage-to-network mapping data structure (e.g., a table) 216, which will be described in more detail below. The storage protocol handler 212 executes protocol specific layers, for example, a Fibre Channel stack. The storage protocol handler 212 receives storage commands and prepares storage protocol specific packets with associated metadata and forwards the same to the dataplane forwarder 204. The metadata includes information regarding storage commands.

In one aspect as shown in FIG. 2, a new network feature or application 124 interacts with a software defined storage (SDS) flow interface module (may also be referred to as SDS flow interface) 226. Examples of the new feature 124 include network, storage, or security applications/software executed by a processor out of a memory device. The SDS flow interface module 226 communicates with an SDS flow manager 228. In one aspect, storage and network flow rules are communicated from the SDS flow interface 226 to the SDS flow manager 228. The SDS flow manager 228, in turn, uses the flow rules to create a SDS flow data structure (e.g., a table) 230. SDS flow data structure 230 includes a listing of prioritized rules (similar to those set forth in Examples 1-3 described above) based on the settings called for by the new feature 124. In one aspect, SDS flow data structure 230 and new feature 124, SDS flow interface 226, and SDS flow manager 228 are modular and can be added to traditional storage systems with no or minor changes. In general, this allows new features 124 to be added, modified, or removed without affecting the general operation of the storage protocol handle 212 and network connection table 214, for example. Additionally, new features 124 can be added, modified, or removed while the changes remain invisible to Applications 105.

As set forth herein, network connection data structure (e.g., a table) 214 may be considered a conventional aspect of networking devices. However, in one aspect of the disclosure, network connection data structure 214, storage-to-network mapping data structure 216, and SDS flow data structure 230 are combined by forwarding table manager 210 to create dataplane forwarding data structures 206 which is used to control operation of dataplane forwarder 204. Storage-to-network mapping data structure 216 is not a conventional data structure or table but, in one aspect, it may be created through a storage interface extension 220A, as described below in detail. In another aspect, traditional storage interface 220 may not need to be modified and may include sufficient information to build storage-to-network mapping data structure (or table) 216. These data structures are described in more detail below.

Additionally, network counters 240, 242, 244 may be associated with the SDS flow data structure 230, a bandwidth controller 208, and a dataplane forwarding data structure 206, respectively. These network counters may be used to limit or control network packet processing in various aspects. For example, each packet processed on a certain connection may increment a bandwidth controller counter 242, so that the adapter 114 can appropriately limit processing of packets for that connection. These counters may enable creation of high level storage-oriented counters. According to one aspect, each entry in the dataplane forwarding data structure 206 has a corresponding entry in a Network Counters Table 244 (labeled "Net ctrs") that counts the number of packets that match that entry and/or the number of bytes in those packets. When requested, the Forwarding Table Manager 210, in one aspect, uses the Storage-to-network mapping table 216 as it reads each Dataplane Forwarding Entry and generates storage-oriented packet counts and bytes for each volume, tenant, and virtual machine. Counters can be calculated based on other criteria as well, such as subnet, VLAN (virtual local area network), or even an arbitrary counter filter consisting of search keys of fields of interest.

Taken as a whole, FIG. 2 illustrates how new network, storage, or security features can define SDS flow rules that include both storage concepts and networking concepts, according to one aspect. When a new storage connection is established by adapter 114 and/or its storage connection manager 218, the SDS flow data structure 230 and Storage-to-network mapping data structure 216 are used by the Forwarding Table Manager 210 to create the appropriate rules in the Dataplane Forwarding data structure 206. Later, the Dataplane Forwarder 204 searches the Dataplane Forwarding data structure 206 to determine the forwarding action for each packet.

The following series of tables and text illustrates how the Network Connection data structure 214, Storage-to-network-mapping data structure 216, and SDS flow data structure 230 are combined to produce the Dataplane Forwarding data structure 206 which is used by the Dataplane Forwarder 204. It should also be noted that while described in some cases below as tables, any of a variety of data structures may be used for any of these elements in various aspects disclosed herein.

Table 1 below illustrates a sample Network Connection Table 214. Each connection is described in a row of the table and identified by a connection ID. Each connection is defined by a volume IP address, a virtual machine (VM) IP address (shown as VM IP); a TCP port identifier for the connection; a volume MAC address and VLAN; a VNET ID (or identifier); and a physical port identifier. In this example, the storage system IP address (Or Volume IP address) is 10.1.1.100, and it has connections to two separate tenant servers (or Virtual Machines—VMs) identified as 10.1.1.21 and 10.1.1.22. The connection table is populated when new connections are established via the traditional storage interface 220 or via new connection requests received over the network.

Table 2 below illustrates an example layout of the storage-to-network mapping table 216. In one aspect, the storage-to-networking table 216 is used to associate high-level, storage-oriented concepts (such as a tenant or storage volumes) with network addresses and values derivable from network packets. More specifically, the high level "storage values" are mapped to network-level definitions. For example, the storage values are more likely to be understood by users of feature 124 or the feature 124 itself. However, the dataplane forwarder 204 will understand the network level values, but may not understand the storage values. This table helps bridge these concepts. This table is populated by the storage connection manager 218 when connections are configured, in one aspect. "{ }" represents a list of one or more elements. For example, a storage "tenant" is defined by one or more VNET IDs. A Virtual Machine is defined by both an IP address and a VNET ID, and a "volume" is defined by an IP address, a VNET ID, and a TCP port.

TABLE 2

Layout of storage-to-network mapping table

| Storage Value | Network Value |
|---|---|
| Tenant | {VNET ID} |
| Virtual machine | {ip address, VNET ID} |
| Volume | {ip address, VNET ID, TCP port} |

Table 3 below illustrates an example of a storage-to-network mapping table 216 showing how network traffic is associated with tenant, virtual machine, or volume. In this example, tenants are identified using a Virtual Network Identifier (VNET_ID). In other aspects, tenants could be identified by a set of a VNIs (virtual network identifiers), a set of VSIDs (virtual subnet identifiers), and a set of IP addresses or subnets. VNET_ID could represent a given physical network or virtual network. VNET_ID can also be identified by some identifier in a network packet or meta-information about the packet such as channel or wavelength. More specifically, while a feature 124 user may understand that they want to set up communications parameters for "virtual machine 21," he or she may not know that "virtual machine 21" is identified by an IP address of 10.1.1.21 and a VNET ID of 101. This table allows users to define network security rules, for example, based on high-level concepts rather than the actual implementation details of the network. Similarly, other storage values that may be used can include customer-assigned names or cloud-provider-assigned identifiers such as Universally Unique Identifiers (UUIDs).

TABLE 3

Sample storage-to-network mapping table

| Storage Value | Network Value |
|---|---|
| Tenant 1 | VNET_ID 101 |
| Tenant 2 | VNET_ID 102 |
| Tenant 3 | VNET_ID 103 |

TABLE 1

Sample Network Connection Table

| Connection ID | Volume IP | VM IP | TCP Port | Volume Mac/VLAN | VNET ID | Phys Port |
|---|---|---|---|---|---|---|
| 1 | 10.1.1.100 | 10.1.1.21 | 1001 | 12:34:56:78:90:01/0 | 101 | 1 |
| 2 | 10.1.1.100 | 10.1.1.22 | 1002 | 12:34:56:78:90:01/0 | 101 | 1 |

TABLE 3-continued

Sample storage-to-network mapping table

| Storage Value | Network Value |
|---|---|
| virtual_machine 21 | vm_ip 10.1.1.21; VNET_ID 101 |
| virtual_machine 22 | vm_ip 10.1.1.22; VNET_ID 101 |
| Volume 61 | vol_ip 10.1.1.100; VNET_ID 101; TCP port 1001 |
| Volume 62 | vol_ip 10.1.1.100; VNET_ID 101; TCP port 1002 |

Table 4 below illustrates an example of an SDS flow data structure 230 that an independent network security or bandwidth management application 124 might create to help ensure the system is secure and that bandwidth for sending and receiving information is properly allocated. Each rule that a user wishes to implement is set forth as a row in Table 4, and each rule has a priority (identified by the rule number, where lower numbers indicate a higher priority), a set of "high-level," storage concept search keys, and an associated action that the user wishes take with respect to network packets meeting the search key criteria. In this example, Tenant 3 is denied access to storage volumes under all conditions. Storage volumes 61 and 62 are accessible under certain conditions. For example, when virtual machine 22 wishes to access volume 62. According to rule 2, if virtual machine 22 attempts to access volume 62, it is to be allowed at a rate limit of 200 MBps. All other volumes and conditions not explicitly matched by rules 1 through 5 are denied based on the "default" rule 6. SDS Search Keys can be Storage Values from the storage-to-network mapping table 216, or Dataplane Search Keys that are directly usable by the dataplane forwarder 204.

TABLE 4

Sample SDS Flow Table

| Rule | SDS Search Keys | Actions |
|---|---|---|
| 1 | Tenant 3 | Deny |
| 2 | Volume 62; virtual machine 22 | Allow; rateLimiter200MBps |
| 3 | Volume 62; | Deny |
| 4 | Volume 61; vm_ip 10.1.1.* | Allow; rateLimiter10MBps |
| 5 | Volume 61; | Deny |
| 6 | Default | Deny |

Table 5 below illustrates the results of combining Tables 1, 2, and 4 to create a Dataplane forwarding table 206. Table 5 describes the forwarding rules used by the dataplane forwarder 204 as it is sending and receiving network packets. As with Table 4, the dataplane forwarding table 206 is an ordered set of rules, where lower numbered rules have higher priority. In this example, the dataplane forwarder 204 examines the rules sequentially looking for the first rule that matches with the parameters of a network packet. The dataplane forwarder 204 would extract dataplane parameters and attempt to match them to a rule's dataplane search key. When there is a rule that matches, the dataplane forwarder processes the network packet based on the action set forth in the "actions" column. For example, a network packet that includes a vol_ip (or source) equal to 10.1.1.100; a vm_ip (or destination) equal to 10.1.1.22; a TCP_Port equal to 1002; a vol_mac equal to 12:34:56:78:90:01; a VLAN=0; and a VNET=101 would be transmitted with a rate limit of 200 MBps. It will be understood that these are example tables only, and most tables would have many more rules for the dataplane forwarder 204. This also illustrates the challenges of defining rules without high level storage concepts, where a large number of specific addresses, ports, and the like would be needed to be known to a user.

TABLE 5

Dataplane forwarding table

| Rule | Dataplane Search Keys | Actions |
|---|---|---|
| 1 | vol_ip=10.1.1.100; vm_ip=10.1.1.21;tcp_port=1001; vol_mac=12:34:56:78:90:01; VLAN=0;VNET=101 | rateLimit10MBps |
| 2 | vol_ip=10.1.1.100; vm_ip=10.1.1.22;tcp_port=1002; vol_mac=12:34:56:78:90:01; VLAN=0;VNET=101 | rateLimit200MBps |
| 3 | TCP_SYN=1 | forward to Storage Protocol Handler |
| 4 | Default | Deny |

Constructing the Dataplane Forwarding Table/Data Structure: When a new connection is attempted, such as by traditional storage interface 220 or the storage connection manager 218, parameters of the proposed connection are compared with the SDS flow data structure 230, using the storage-to-network mapping data structure 216 to translate storage-specific search keys into network search keys that are usable by the dataplane forwarder 204. When comparing against rules in the SDS flow data structure 230, fields that are not present in the search keys are assumed to match, in one aspect. For example, Rule 1 of the SDS Flow table (of Table 4) will match all connections involving Tenant 3, regardless of the volume or other fields. Also, a portion of a search key can be ignored; this is represented with a "*" wildcard indicator.

For example, when Connection ID 1 of Table 1 is configured, it is first evaluated against SDS Rule 1 of Table 4—"Tenant 3 deny." According to Table 3, Tenant 3 is VNET_ID 103. Connection ID 1 is not for VNET_ID 103, so SDS Rule 1 does not match. Next, SDS Rule 2 is evaluated. Volume 62 uses TCP port 1002, so connection ID 1 does not match SDS Rule 2, nor does it match SDS Rule 3. Next, SDS Rule 4 is evaluated, which is for volume 61 (vol_ip 10.1.1.100, TCP port 1001, VNET_ID 101) and vm_ip 10.1.1.*. The connection does match SDS Rule 4, so the Dataplane Forwarding Table Rule 1 is written with the connection information and SDS Rule 4 Action (rateLimiter10 Mbps).

When Connection ID 2 is added, it is evaluated against the SDS Flow Table (230) using the same process. Based on the Storage-To-Network mapping table 226, connection ID 2 is for virtual machine 22, and volume 62. This matches SDS Flow rule 2, so Dataplane Forwarding Table Rule 2 is written with this connection information and the actions of SDS Rule 2 (See Table 5).

If a connection is attempted for VNET 103, the storage-to-network mapping table 226 maps that to Tenant 3, and when rules of the SDS Flow data structure 230 are evaluated it matches SDS Rule 1 (deny). This connection is rejected and is not written to the Dataplane Forwarding Table 206.

Similar to the matching process used for the SDS flow data structure, the Dataplane forwarding data structure 206 can also support the "*" wildcard indicator, and is presumed to match search keys that are not specified.

Figure 3A:
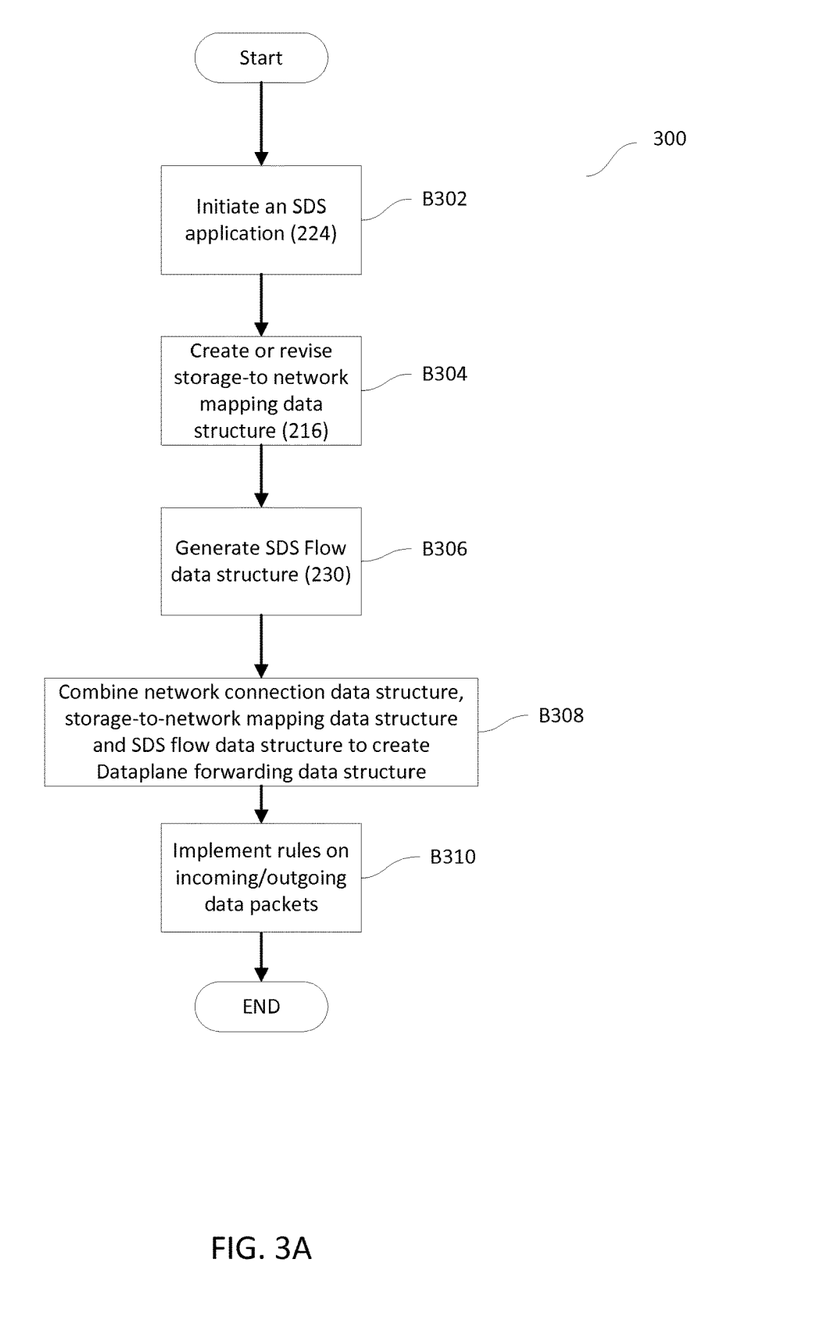
FIGS. 3A and 3B are process flow diagrams for configuring packet handling, according to one aspect of the present disclosure.

Process Flow: Turning to FIG. 3A, one aspect of the disclosure illustrates a method for configuring network storage interfaces. Starting with an initiated and operational adapter 114 running a storage connection manager 218, a forwarding table manager 230, and a dataplane forwarder 204, at block B302, the system initiates a new feature/application 124. For example, a new security module may be implemented that can control access within a storage network. At block B304, the storage connection manager 218 creates or updates the storage-to-network mapping data structure 216. In one aspect, this may be triggered by a traditional storage interface 220 or an interface extension 220A. The storage-to-network mapping data structure associates storage-oriented concepts with search keys derivable from network packets. In one aspect, new feature 124 may define new storage-oriented concepts. For example, new security features may deny Tenant 3 from access (as illustrated in Table 4).

At block B306, the new feature 124 generates an SDS flow data structure 230, such as through SDS flow manager 228. Generally, SDS flow data structure 230 maps SDS search keys to actions for handling packets that meet the search keys. At block B308, the forwarding table manager 210 combines network connection data structure 214, storage-to-network mapping data structure 216 and SDS flow data structure 230 to create dataplane forwarding data structure 206. In this manner, network connection information from the network connection data structure can be mapped to SDS actions through the translation of the storage-to-network mapping data structure 216 and the SDS flow data structure 230. Dataplane forwarder 204 can then implement the rules of the dataplane forwarding data structure 206 on incoming and/or outgoing data packets at block B310.

Figure 3B:
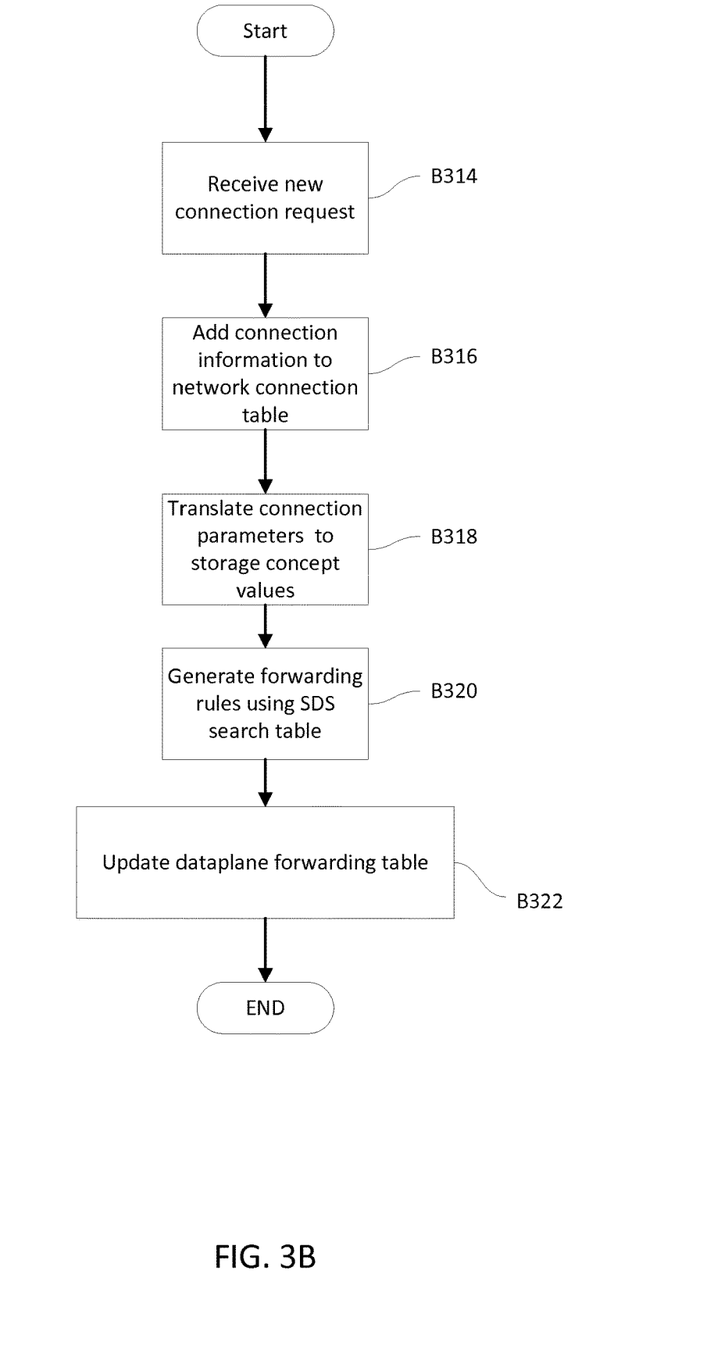

FIG. 3B illustrates a method for processing a new connection according to one aspect. At block B314, a new connection request is received, such as from traditional storage interface 220. In one aspect, this may be handled by the storage connection manager 218 or any other module, for example, the SDS flow interface module 226. At block B316, the connection information is added to network connection table 124 by the storage connection manager 218. At block B318, the connection information is translated into storage concept values through comparison with the storage-to-network mapping table 216. In one aspect, this may be handled by storage connection manager 218 or it may be handled by forwarding table manager 210. At block B320, new dataplane forwarding rules are generated by comparing the translated data from block B318 with SDS flow data structure 230. The new rule or rules generated are then stored in the dataplane forwarding data structure 206, at block B322.

Ingress and Egress Forwarding: In one aspect, the Dataplane Forwarder 204 evaluates rules of the Dataplane Forwarding data structure 206 on ingress and egress—or receiving and sending network data packets. A "port" search key can identify rules specific to a given physical port. In an aspect, Ports 0-253 indicate specific ingress ports; while Port 255 indicates egress transmission. When a packet is received (ingress), the port number of reception is used as the port search key to determine the rule or set of rules that may apply to the received packet. Up to 254 unique ports can be supported in this manner. When a packet is transmitted, the value 255 is used as the port search key. In an aspect, specific port numbers are not used for egress transmissions because the egress port number is often produced as a result of the forwarding action. Identifiers representing specific groups of ports could also be created; for example, port 254 could represent any ingress port. To support rules representing a group of ports, a separate port group calculation can be done with a port grouping table. The input to the port group table is a port number (for example 0-99), and the output is a port group (say 100-253) or port number if the port is not a member a group.

In one aspect, when a packet is received by network interface 202 from network 116, the destination IP address of the packet is used as the "vol_ip" search key, and the source IP address of the packet is used as the "vm_ip" search key. When transmitting a packet from, for example, application 105 to network 116, the destination IP address is used as the "vm_ip" search key, and the source IP address is used as the "vol_ip" search key. A similar mapping may be used for the volume MAC address. In an aspect, inbound and outbound rules may be the same for a given connection, and a single rule can cover inbound and outbound (using port=*). However, unique inbound and outbound rules are also supported, using specific port number values.

Split Action SDS Flow Rules: In some cases, packets for a given connection need to increment different network flow counters, such as network counters 240 or 244, based on some criteria. To support this, the connection rules may be split into multiple Dataplane Forwarding rules. A special split-action SDS match qualifier is used to achieve this. When a split-action SDS match qualifier is present, the Forwarding Table Manager 230 will create multiple dataplane forwarding rules for matching connections, each with a different value for the designated match qualifier. Without a split-action qualifier, only one Dataplane Forwarding Rule may be created for a given connection. In one aspect, all split-action values for a given set of search keys are specified contiguously. This is illustrated below in Table 6 and Table 7, where a feature 124 may wish to track different types of Tenant 1 communications.

Table 6 illustrates a sample SDS flow table 230, similar to those described above. However, rather than simply "allowing" access to Tenant 1, the SDS flow table is created with two different rules allowing counters for each to be incremented separately. In one aspect, certain types of Tenant 1 communications may be referred to as split action with a TCP_SACK identifier of 1 and others with the identifier being 0.

Table 7 illustrates the dataplane forwarding table 206 that results from applying Table 6's SDS flow table. As shown, a single Tenant 1 connection will result in two Dataplane Forwarding Rules. In this example, the first rule allows counters to be incremented for packets that qualify as TCP Selective Acknowledgement (SACK) packets (the value 1 in the table indicates a "yes" or "true" that a packet is a TCP SACK packet), and the second rule increments counters for non-SACK packets (the value 0 in the table indicates a "no" or "false" for the packet being a SACK packet). The dataplane forwarder generates the TCP_SACK search key based on the presence of a TCP SACK option in the packet. TCP SACKs are generally used to identify packets that have been delivered when there is a gap that some have not been delivered. It may therefore be beneficial to determine, for example, how many times a connection has lost packets based on these rules.

TABLE 6

SDS Flow Table with Split-action flow rules:

| Rule | SDS Search Keys | Actions |
| --- | --- | --- |
| 1 | Tenant 1, split-action TCP_SACK=1 | Allow |
| 2 | Tenant 1, split-action TCP_SACK=0 | Allow |
| 3 | Tenant 2 | Allow |

TABLE 7

Sample Dataplane Forwarding Table resulting from split-action SDS rules:

| Rule | Dataplane Search Keys | Actions |
|---|---|---|
| 1 | vol_ip=10.1.1.100; vm_ip=10.1.1.21;tcp_port=1001;vol_mac= 12:34:56:78: 90:01;VLAN=0;VNET=101; TCP_SACK=1 | Allow |
| 2 | vol_ip=10.1.1.100; vm_ip=10.1.1.21;tcp_port=1001;vol_mac= 12:34:56:78: 90:01;VLAN=0;VNET=101; TCP_SACK=0 | Allow |
| 3 | TCP_SYN=1 | forward to Storage Protocol Handler |
| 4 | Default | deny |

Bandwidth Controller: Aspects of the present disclosure can also enable flexible storage bandwidth control. In Table 4, "rateLimit10 MBps" is an identifier that selects a particular entry in a Bandwidth Control table of the Bandwidth Controller 208. Multiple SDS rules can share the same collective rate limiter, or use separate rate limiters.

In one aspect, the bandwidth controller 208 can override or add additional forwarding actions. Bandwidth controllers commonly available can change the forwarding action to drop, alter the packet priority, or modify a DiffServ Code Point (DSCP) of the packet. An SDS bandwidth controller can also signal other entities such as the Storage Protocol Handler and affect behavior of TCP or storage protocols such as FC, iSER, or iSCSI. For example, this signaling can cause a protocol to slow down packet transmission, or give less transmission credit to a remote node that is sending too much data to the network interface 202. As an example, when a bandwidth limit is reached for a particular bandwidth controller ID (stored in counters 242), the bandwidth controller 208 will signal the storage protocol handler 212 that a bandwidth limit has been reached for the set of one or more connections that share a bandwidth control ID. When the storage protocol handler 212 receives this signal, it can, in various aspects, stop transmitting for the given connection, stop granting credit to a "leaky-bucket"-type transmission scheduler, and/or stop granting transmission credit to a remote sender to slow down the rate of reception. The set of connections affected by a given bandwidth controller ID is identified in advance—when a connection is established and the forwarding table manager 210 creates the dataplane forwarding rules for the connection, it will also add the connection ID to a list of connection IDs using a particular bandwidth controller ID, and this will be stored within the bandwidth controller 208.

Types of Search Keys and Actions: It is noteworthy that the discussions herein are examples only. In various aspects, many things can be included as search keys. For example, packet metadata can be a search key (e.g., process ID or time of transmission). In one aspect, volume health can be a search key. For example, most modern disk drives (HDDs) include a feature called SMART drive monitoring to predict drive failures. It is often reported as a Green/Yellow/Red status. Using this status as a search key—if the status is yellow or red for example—the system can impose a rate limit to slow down the use of an aging drive or send a copy of packets meeting the criteria to a second network location that may house a backup system. This may help prevent data loss or facilitate data recovery for example.

A random number can also be a search key, which would allow a statistically accurate sampling system wherein on average one out of every N packets (where N is the random number) are copied to an analysis system. In the presence of non-random traffic, this produces a better sample than non-random countdown sampling. Another use of random keys could be to implement WRED (weighted random early detect) queuing wherein Queue depth and packet content determine drop probability. For example, actions with a random number with 8 possible values would be represented by 8 rules. As an example, to implement WRED for a single connection, search keys may include the MAC address, VNET_ID, the IP addresses, TCP port, a queue-almost-full flag, and a 3-bit uniform distribution random number. There would be a "permit" rule for the connection with queue-almost-full=0, and 8 additional rules with queue_almost_full=1 and match values of the random field of 000 through 111. When a packet is forwarded and the queue is almost full, a random number is generated and presented as one of the search keys. Next the matching rule is found which results in a permit/deny action. To get a 50% drop probability when the queue is almost full, half of the rules would be programmed with deny, and the other half permit; to get an 87.5% drop probability, 7 of the rules would be programmed with deny. One of skill in the art will understand other designs are possible, but this provides a simple example. TCP flags can be search keys.

Based on individual system design objectives, implementations of the present disclosure can allow any field of a packet to be a search key of the Dataplane Forwarding Table 206 or the SDS Flow Table 230. Other possible keys include functions of fields of packets [e.g., key=f(src_ip, dst_ip)] or status of the system (e.g., temperature or power state). Search keys that are fast to generate can be in the Dataplane Forwarding table 206. The SDS Flow Table 230 can also include higher level keys defined in the storage-to-network mapping table 216.

In some aspects, dataplane forwarding table 206 may be able to be reduced in size by compressing the "dataplane search key" field and using that as a search key instead of an original non compressed value. For example, a hash function may provide a unique identifier for a rule that can be used to compare to hash values based on fields from data packets to be processed.

To support multi-tenant networks such as virtual extensible LAN (VXLAN) or network virtualization using generic routing encapsulation (NVGRE), actions can set an encapsulation header with an addresses of a cloud provider system hosting a tenant virtual machine. Actions involving setting destination addresses and adding encapsulation headers are performed only for egress packets. Actions involving encapsulation header removal, host receive queues, or host interrupt handling are performed only for ingress packets.

SDS And OpenFlow: Although the SDS flow data structure 230 examples outlined in this disclosure have primarily illustrated cloud storage concepts such as volume and tenant, an SDS flow data structure 230 could be created that only uses standard networking concepts such as those of the OpenFlow specification, a standard specification developed for switches. This could be implemented using the OpenFlow Wire Protocol in an HBA. This could enable a scalable cloud network fabric wherein the tenant-specific network packet policies are enforced in the HBA. The cloud network fabric would include cloud provider network policies and would not need to be filled with the detailed network packet policies for the thousands of tenants.

Although the present disclosure has been described with reference to specific aspects, these aspects are illustrative only and not limiting. For example, although the description above has been described with respect to an adapter, any other device, such as a router, a switch, a computer, a server, or the like may be configured to perform the foregoing function. Additionally, the description herein provides a number of examples in relation to a storage system, but the teachings are equally applicable to other general or special purpose networking systems. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine-implemented method for a network, the method comprising:

generating a network connection data structure by an adapter coupled to a server, for communicating with a storage device on behalf of one or more storage tenants using a network connection to the network via the adapter; wherein a record from among a plurality of records of the network connection data structure identifies the network connection by a connection identifier, and includes a network access address for a storage volume, a network access address for a virtual machine, a virtual network identifier (VNET) and a port identifier identifying an adapter port used for the network connection;

generating by the adapter, a storage-to-network mapping data structure, the storage-to-network mapping data structure maps a storage tenant to the virtual network identifier stored at the network connection data structure, maps the virtual machine to the network access address of the virtual machine and the virtual network identifier, and maps the storage volume to the network access address of the storage volume, the virtual network identifier and the port identifier;

receiving by the adapter, a flow data structure comprising a set of network connection processing rules for the storage tenant, the storage volume and the virtual machine, wherein the flow data structure is received when a new application or a new security feature is introduced to access the storage device via the network connection;

combining by the adapter, the network connection data structure, the storage-to-network mapping data structure, and the flow data structure to generate a dataplane forwarding data structure, wherein the dataplane forwarding data structure provides a set of network packet processing rules that are used by a dataplane forwarder module of the adapter for processing a network packet; wherein the set of network processing rules are arranged by priority and define an action associated with each rule; and processing the network packet by the adapter, according to a rule from among the set of network processing rules of the dataplane forwarding data structure.

2. The method of claim 1, wherein the network access address for the storage volume includes an Internet Protocol (IP) address and a media access control (MAC) address, and the network access address of the virtual machine is another IP address.

3. The method of claim 1, wherein the flow data structure set of network processing rules comprise one or more of the following actions: grant access, deny access, and rate limit access.

4. The method of claim 1, wherein the processing a network packet includes extracting packet metadata from the packet for look-up in the dataplane forwarding data structure.

5. The method of claim 1, wherein the processing of the network packet comprises finding a first matching rule in the set of network packet processing rules and executing an action associated with that rule.

6. The method of claim 1 wherein the dataplane forwarding data structure further comprises a set of network counters related to one or more of the network packet processing rules.

7. The method of claim 1 further comprising:

updating the dataplane forwarding data structure with a new data flow data structure when another security feature or application is added to access the storage device.

8. A network device coupled to a computing device for communicating with a storage device on behalf of one or more storage tenants using a network connection to a network, comprising:

a network port;

a processor; and memory for storing machine executable instructions, that, when executed by the processor, cause the device to:

generate a network connection data structure; wherein a record from among a plurality of records of the network connection data structure identifies the network connection by a connection identifier, and includes a network access address for a storage volume, a network access address for a virtual machine, a virtual network identifier (VNET) and a port identifier identifying an adapter port used for the network connection;

generate a storage-to-network mapping data structure, the storage-to-network mapping data structure maps a storage tenant to the virtual network identifier stored at the network connection data structure, maps the virtual machine to the network access address of the virtual machine and the virtual network identifier, and maps the storage volume to the network access address of the storage volume, the virtual network identifier and the port identifier;

receive a flow data structure comprising a set of network connection processing rules for the storage tenant, storage volume and the virtual machine, wherein the flow data structure is received when a new application or a new security feature is introduced to access the storage device via the network connection;

combine the network connection data structure, the storage-to-network mapping data structure, and the flow data structure to generate a dataplane forwarding data structure, wherein the dataplane forwarding data structure provides a set of network packet processing rules that are used by a dataplane forwarder module of the adapter for processing a network packet; wherein the set of network processing rules are arranged by priority and define an action associated with each rule; and process the network packet according to a rule from among the set of network processing rules of the dataplane forwarding data structure.

9. The network device of claim 8, wherein the network access address for the storage volume includes an Internet Protocol (IP) address and a media access control (MAC) address, and the network access address of the virtual machine is another IP address.

10. The network device of claim 8, wherein the flow data structure set of network processing rules comprise one or more of the following actions: grant access, deny access, and rate limit access.

11. The network device of claim 8, wherein the processing a network packet includes extracting packet metadata from the packet for look-up in the dataplane forwarding data structure.

12. The network device of claim 8, wherein the processing of the network packet comprises finding a first matching rule in the set of network packet processing rules and executing an action associated with that rule.

13. The network device of claim 8 wherein the dataplane forwarding data structure further comprises a set of network counters related to one or more of the network packet processing rules.

14. The network device of claim 8 further comprising instructions to:
update the dataplane forwarding data structure with a new data flow data structure when another security feature or application is added to access the storage device.

15. A non-transitory machine readable storage medium having stored thereon instructions for performing a method for a network, comprising machine executable code which when executed by at least one machine, causes the machine to:
generate a network connection data structure by an adapter coupled to a server for communicating with a storage device on behalf of one or more storage tenants using a network connection to the network via the adapter; wherein a record from among a plurality of records of the network connection data structure identifies the network connection by a connection identifier, and includes a network access address for a storage volume, a network access address for a virtual machine, a virtual network identifier (VNET) and a port identifier identifying an adapter port used for the network connection;
generate by the adapter, a storage-to-network mapping data structure, the storage-to-network mapping data structure maps a storage tenant to the virtual network identifier stored at the network connection data structure, maps the virtual machine to the network access address of the virtual machine and the virtual network identifier, and maps the storage volume to the network access address of the storage volume, the virtual network identifier and the port identifier; receive by the adapter, a flow data structure comprising a set of network connection processing rules for the storage tenant, the storage volume and the virtual machine, wherein the flow data structure is received when a new application or a new security feature is introduced to access the storage device via the network connection;
combine by the adapter, the network connection data structure, the storage-to-network mapping data structure, and the flow data structure to generate a dataplane forwarding data structure, wherein the dataplane forwarding data structure provides a set of network packet processing rules that are used by a dataplane forwarder module of the adapter for processing a network packet; wherein the set of network processing rules are arranged by priority and define an action associated with each rule; and
process the network packet by the adapter, according to a rule from among the set of network processing rules of the dataplane forwarding data structure.

16. The machine-readable medium of claim 15, wherein the network access address for the storage volume includes an Internet Protocol (IP) address and a media access control (MAC) address, and the network access address of the virtual machine is another IP address.

17. The machine-readable medium of claim 15, wherein the flow data structure set of network processing rules comprise one or more of the following actions: grant access, deny access, and rate limit access.

18. The machine-readable medium of claim 15, wherein the processing a network packet includes extracting packet metadata from the packet for look-up in the dataplane forwarding data structure.

19. The machine-readable medium of claim 15, wherein the processing of the network packet comprises finding a first matching rule in the set of network packet processing rules and executing an action associated with that rule.

20. The machine-readable medium of claim 15 wherein the dataplane forwarding data structure further comprises a set of network counters related to one or more of the network packet processing rules.

21. The machine-readable medium of claim 15 further comprising instructions to:
update the dataplane forwarding data structure with a new data flow data structure when another security feature or application is added to access the storage device.

* * * * *